US010969482B2

(12) United States Patent
Chowdhury et al.

(10) Patent No.: US 10,969,482 B2
(45) Date of Patent: Apr. 6, 2021

(54) RADAR AND ULTRASOUND SENSOR BASED REAL TIME TRACKING OF A MOVING OBJECT

(71) Applicant: Tata Consultancy Services Limited, Mumbai (IN)

(72) Inventors: Arijit Chowdhury, Kolkata (IN); Raj Rakshit, Kolkata (IN); Tapas Chakravarty, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 345 days.

(21) Appl. No.: 16/254,190

(22) Filed: Jan. 22, 2019

(65) Prior Publication Data

US 2019/0277961 A1 Sep. 12, 2019

(30) Foreign Application Priority Data

Mar. 9, 2018 (IN) .............................. 201821008857

(51) Int. Cl.
*G01S 13/86* (2006.01)
*G01S 13/56* (2006.01)
(Continued)

(52) U.S. Cl.
CPC ............ *G01S 13/862* (2013.01); *G01S 13/56* (2013.01); *G01S 13/583* (2013.01); *G01S 15/42* (2013.01);
(Continued)

(58) Field of Classification Search
CPC ...... G01S 13/862; G01S 15/586; G01S 17/58; G01S 15/42; G01S 15/66; G01S 13/583;
(Continued)

(56) References Cited

U.S. PATENT DOCUMENTS 8,643,533 B1 * 2/2014 Woodell ................ G01S 13/882
342/26 B
9,612,123 B1 * 4/2017 Levinson ............... B60W 30/09
(Continued)

OTHER PUBLICATIONS

GouravV, D. et al. "Ultrasonic Radar for Object Detection, Distance, and Speed Measurement," *National Conference Momentum-17*, Feb. 14-15, 2017, Pune, India; 6 pages.
(Continued)

*Primary Examiner* — Olumide Ajibade Akonai
(74) *Attorney, Agent, or Firm* — Finnegan, Henderson, Farabow, Garrett & Dunner, LLP

(57) ABSTRACT

The present disclosure provides means for detecting and tracking a moving object using RADAR and ultrasonic sensors. A stationary RADAR detects the moving object and estimates speed and two rotating ultrasonic sensors determine distance of the detected object. An incrementally changing orientation of the ultrasound sensors is associated with an angular speed of rotation based on a last logged distance of the moving object from the ultrasound sensors. Once the moving object is detected, based on an adaptively changing sampling frequency, the moving object is continuously tracked in real time. Conventionally, multiple RADARs are needed for location estimation and motion tracking. Also, merely using a RADAR in combination with an ultrasound sensor also does not serve the purpose since both sensors are static. The present disclosure provides a simple cost effective alternative that can find application in say tracking of an elderly person living alone in an unobtrusive manner.

19 Claims, 4 Drawing Sheets

(51) Int. Cl.
  *G08B 21/04* (2006.01)
  *G01S 15/58* (2006.01)
  *G01S 17/58* (2006.01)
  *G01S 15/42* (2006.01)
  *G01S 15/66* (2006.01)
  *G01S 13/58* (2006.01)
  *G01S 15/87* (2006.01)
  *G01S 3/80* (2006.01)

(52) U.S. Cl.
  CPC ............ *G01S 15/586* (2013.01); *G01S 15/66* (2013.01); *G01S 15/87* (2013.01); *G01S 17/58* (2013.01); *G08B 21/0415* (2013.01); *G08B 21/0492* (2013.01); *G01S 3/80* (2013.01)

(58) Field of Classification Search
  CPC . G01S 15/87; G01S 13/56; G01S 3/80; G01S 17/42; G01S 17/931; G01S 7/4817; G01S 17/86; G01S 13/72; G01S 13/58; G01S 13/06; G08B 21/0415; G08B 21/0492; B60W 2420/52
  See application file for complete search history.

(56) References Cited

U.S. PATENT DOCUMENTS

2012/0019185 A1    1/2012  Guidarelli et al.
2016/0223649 A1*  8/2016  Schwindt .............. G01S 7/4026
2018/0045811 A1*  2/2018  Cao ....................... G01S 7/4004

OTHER PUBLICATIONS

Nishida, Y. et al. "Minimally Privacy-Violative Human Location Sensor by Ultrasonic Radar Embedded on Ceiling," *2004 IEEE Sensors Conference*, Oct. 24-27, 2004, Vienna, Austria; 5 pages.

Kodagoda, S. et al. "Obstacle Detection and Map Building with a Rotating Ultrasonic Range Sensor using Bayesian Combination," *2006 International Conference on Information and Automation*, Dec. 15-17, 2006, Shandong, China; 7 pages.

\* cited by examiner

RADAR AND ULTRASOUND SENSOR BASED REAL TIME TRACKING OF A MOVING OBJECT

PRIORITY CLAIM

This U.S. patent application claims priority under 35 U.S.C. § 119 to: Indian Patent Application No. 201821008857, filed on 9 Mar. 2018. The entire contents of the aforementioned application are incorporated herein by reference.

TECHNICAL FIELD

The disclosure herein generally relates to moving object detection, and more particularly relates to systems and methods for RAdio Detection And Ranging (RADAR) and ultrasound sensor based real time tracking of a moving object.

BACKGROUND

Automatically tracking motion of an object typically inside a small room in an unobtrusive manner finds application in a scenario like monitoring of an elderly person living alone and being under medical treatment, wherein an emergency situation like the person having a fall may have to be alerted. Conventionally, Doppler RAdio Detection And Ranging (RADAR) based systems are available for such applications. Both distance and speed can be measured by a Pulsed Doppler RADAR or a Frequency Modulated Continuous Wave RADAR (FMCW), but circuit and computation complexity is a challenge particularly when the area under observation is very close and a high range resolution is needed. Hence, multiple RADAR modules are required for location estimation as well as motion tracking.

SUMMARY

Embodiments of the present disclosure present technological improvements as solutions to one or more of the above-mentioned technical problems recognized by the inventors in conventional systems.

In an aspect, there is provided a processor implemented method comprising: receiving a first echo response from a moving object detector indicative of the moving object under observation being detected in a field of view (FOV) of the moving object detector; logging speed of the moving object based on the first echo response; and tracking the moving object continuously in real time, by a moving object tracker, upon detecting the moving object by the moving object detector, wherein the tracking comprises: incrementally changing orientation of the moving object tracker from either a last locked-in position or a 0° angle of rotation, by a pre-configured value, until the moving object is detected in a field of regard (FOR) of the moving object tracker; receiving a second echo response from the moving object tracker when the moving object is detected in the FOR of the moving object tracker; logging distance of the moving object from the moving object tracker along with an associated time stamp and a current orientation of the moving object tracker, based on the second echo response; computing speed of the moving object based on the logged distance and the associated time stamp; comparing the computed speed of the moving object with the logged speed by the moving object detector to confirm the moving object tracked by the moving object tracker is the same as the moving object detected by the moving object detector; and locking the orientation of the moving object tracker at the current orientation based on the comparison, wherein the current orientation is the last locked-in position before the moving object moves out of the FOR.

In another aspect, there is provided a tracking apparatus comprising: a moving object detector being one of a RAdio Detection And Ranging (RADAR), SOund Navigation And Ranging (SONAR) and Light Detection And Ranging (LIDAR) positioned such that a moving object under observation lies in a field of view (FOV) thereof; a moving object tracker located proximate the moving object detector, the moving object tracker comprising two ultrasound sensors having a common axis of rotation, each ultrasound sensor being mechanically coupled to a corresponding stepper motor configured to incrementally rotate the two ultrasound sensors by a pre-configured angle of rotation in opposite directions, until a maximum permissible rotation angle for either of the two ultrasound sensors is attained; a controller unit comprising: one or more data storage devices configured to store instructions; and one or more hardware processors operatively coupled to the one or more data storage devices, wherein the one or more hardware processors are configured by the instructions to: receive a first echo response from the moving object detector indicative of the moving object being detected in the field of view (FOV) of the moving object detector; log speed of the moving object based on the first echo response; and track the moving object continuously in real time, by a moving object tracker, upon detecting the moving object by the moving object detector, wherein the moving object is tracked continuously in real time by: incrementally changing orientation of the moving object tracker from either a last locked-in position or a 0° angle of rotation, by a pre-configured value, until the moving object is detected in a field of regard (FOR) of the moving object tracker; receiving a second echo response from the moving object tracker when the moving object is detected in the FOR of the moving object tracker; logging distance of the moving object from the moving object tracker along with an associated time stamp and a current orientation of the moving object tracker, based on the second echo response; computing speed of the moving object based on the logged distance and the associated time stamp; comparing the computed speed of the moving object with the logged speed by the moving object detector to confirm the moving object tracked by the moving object tracker is the same as the moving object detected by the moving object detector; and locking the orientation of the moving object tracker at the current orientation based on the comparison, wherein the current orientation is the last locked-in position before the moving object moves out of the FOR.

In yet another aspect, there is provided a system comprising: one or more data storage devices operatively coupled to the one or more processors and configured to store instructions configured for execution by the one or more processors to: receive a first echo response from a moving object detector indicative of the moving object under observation being detected in a field of view (FOV) of the moving object detector; log speed of the moving object based on the first echo response; and track the moving object continuously in real time, by a moving object tracker, upon detecting the moving object by the moving object detector, wherein the moving object is tracked continuously in real time by: incrementally changing orientation of the moving object tracker from either a last locked-in position or a 0° angle of rotation, by a pre-configured value, until the moving object is detected in a field of regard (FOR) of the moving object tracker; receiving a second echo response from the moving object tracker when the moving object is detected in the FOR of the moving object tracker; logging distance of the moving object from the moving object tracker along with an associated time stamp and a current orientation of the moving object tracker, based on the second echo response; computing speed of the moving object based on the logged distance and the associated time stamp; comparing the computed speed of the moving object with the logged speed by the moving object detector to confirm the moving object tracked by the moving object tracker is the same as the moving object detected by the moving object detector; and locking the orientation of the moving object tracker at the current orientation based on the comparison, wherein the current orientation is the last locked-in position before the moving object moves out of the FOR.

In an embodiment of the present disclosure, wherein incrementally changing orientation of the moving object tracker is associated with an angular speed of rotation thereof, the angular speed of rotation being a function of a last logged distance of the moving object from the moving object detector and an angle of rotation associated with the last locked-in position.

In an embodiment of the present disclosure, the one or more hardware processors are further configured to perform the step of logging the distance of the moving object from the moving object tracker along with an associated time stamp and a current orientation of the moving object tracker at an adaptively changing sampling frequency that is pre-configured based on empirical knowledge of the object being observed and is inversely proportional to the last logged distance of the moving object from the moving object tracker.

In an embodiment of the present disclosure, the one or more hardware processors are further configured to position the moving object detector such that the moving object under observation lies in the FOV thereof.

In an embodiment of the present disclosure, the moving object detector is one of a RAdio Detection And Ranging (RADAR), SOund Navigation And Ranging (SONAR) and Light Detection And Ranging (LIDAR).

In an embodiment of the present disclosure, the one or more hardware processors are further configured to position the moving object tracker such that the moving object under observation lies in the FOR thereof.

In an embodiment of the present disclosure, the moving object tracker comprises two ultrasound sensors, each ultrasound sensor being mechanically coupled to a corresponding stepper motor configured to incrementally change the orientation of the moving object tracker.

In an embodiment of the present disclosure, the one or more hardware processors are further configured to incrementally change the orientation of the moving object tracker by rotating the two ultrasound sensors having a common axis of rotation in opposite directions by the pre-configured value until a maximum permissible rotation angle for either of the two ultrasound sensors is attained.

In an embodiment of the present disclosure, the one or more hardware processors are further configured to log the distance of the moving object from the moving object tracker along with an associated time stamp and a current orientation of the moving object tracker by aligning the current orientation of a first ultrasound sensor of the two ultrasound sensors with the current orientation of a second ultrasound sensor of the two ultrasound sensors that has detected the moving object and locking the current orientation thereof.

It is to be understood that both the foregoing general description and the following detailed description are exemplary and explanatory only and are not restrictive of the embodiments of the present disclosure, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
FIG. 1 illustrates an exemplary block diagram of a system for RAdio Detection And Ranging (RADAR) and ultrasound sensor based real time tracking of a moving object, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The present disclosure addresses a technical problem of automatically tracking motion of an object particularly in a small room, say a 5 m×5 m area in an unobtrusive manner with minimal number of sensors thereby providing a simple and low cost solution. Continuous Wave (CW) Doppler RADARs are simplest to build and with very low cost. Additionally, while the CW Doppler RADARs can measure velocity with high precision, it completely ignores secondly reflections from static objects (like furniture). But a major disadvantage of CW Doppler RADAR is that it cannot measure range i.e. the distance of the moving object from the RADAR. Moreover, if the object moves at an angle to the radar beam, the measured speed is quite different from it actual speed. On the other hand, both distance and speed can be measured by either a Pulsed Doppler RADAR or a Frequency Modulated CW (FMCW) RADAR. But for both these RADARs, circuit and computation complexity is a challenge due to the fact that the area under observation is very close (approx. 5 m) and therefore the range resolution expected may be 0.2 m or better. For a standard FMCW RADAR module at X-band (10.525 GHz), a frequency tuning slope of 0.75 GHz/V may be required i.e. applying 1V external voltage, the operating frequency of the radar may be shifted by 0.75 GHz. This may be simpler to achieve at much higher frequencies rather than at X-band. Similarly, pulsed RADARs may require less than 1 nsec pulse width which may not be commonly achieved. For instance, 0.2 m resolution is achievable using a 1.33 ns pulse. These challenges make it impossible to use a single unit of say a CW Doppler RADAR to track a moving object despite the fact that its angular spread is wide.

Ultrasound sensors facilitate measuring distance of an object irrespective of whether the object is in motion or is stationary. Moreover, the angular speed is also narrow (typically 15 deg.) In accordance with the present disclosure, a Doppler RADAR may be combined with ultrasound sensors to facilitate tracking speed as well as distance of a moving object from the sensors. However, a simple system combining one ultrasound sensor as a distance measurement unit with one CW RADAR will inevitably face significant challenges in real life scenarios. Both the sensors are static i.e. their fields of views (FOVs) do not change as the object moves around. As long as the object is within the ultrasound sensor's FOV, the distance can be measured; as soon as the object moves out, the signal will get reflected from the opposite side wall and the distance measurement remains unchanged thereby providing erroneous readings.

In accordance with the present disclosure, a stationary RAdio Detection And Ranging (RADAR) along with two rotating ultrasound sensors achieves this objective. The RADAR detects speed of a moving object and upon detection of the moving object, it triggers the ultrasound sensors to start tracking the moving object and based on the direction of motion, change the FOVs as required and identify the location of the object, both in terms of angle and range of the object under observation. It may be noted that "beam steering" or steering an antenna beam electronically may also be employed; however electronic beam steering requires large antenna rays with phase shifters and controllers making the apparatus expensive and ineffective for large scale deployments. Such a system may be used for tracking an elderly person living alone or a person under medical treatment so that information related to tracking may be further used for generating an alert in the event of an emergency situation. In the context of the present disclosure, the expression 'object' may refer to a human, an object on a conveyor belt for say, automated package transfer, or even a robot whose movements need to be observed for further analysis or action. Although the discussion herein after may refer to a small room or a closed area, it may be understood by a person skilled in the art that the systems, methods and apparatus described hereinafter may be applied to any area under observation being limited mainly by the Field of View (FOV) of the sensors used. For a larger area under observation, a plurality of such apparatus may be deployed, each apparatus covering a portion of the larger area and a unified analysis may be performed thereafter.

Figure 2A:
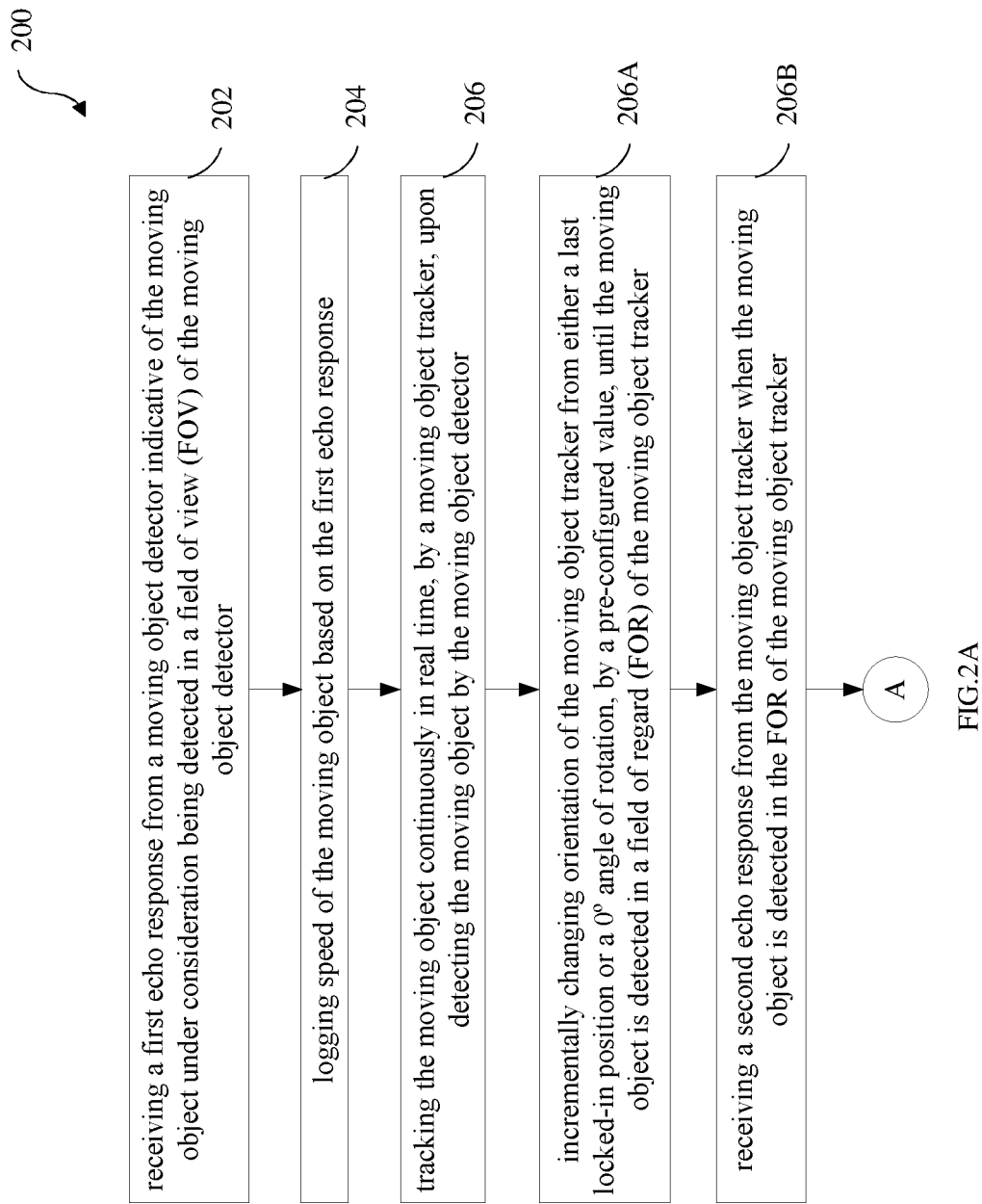
FIG. 2A through FIG. 2B is an exemplary flow diagram illustrating a computer implemented method for RADAR and ultrasound sensor based real time tracking of a moving object, in accordance with an embodiment of the present disclosure.
Figure 2B:
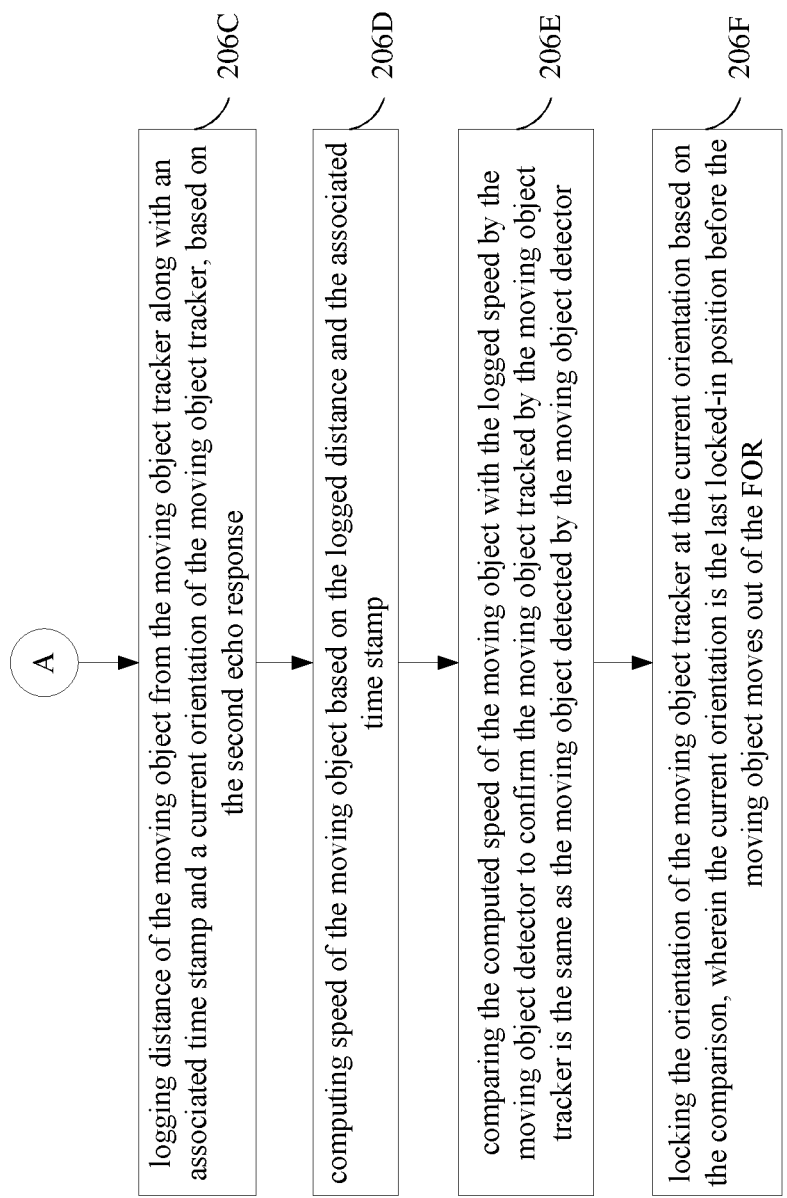
Figure 3:
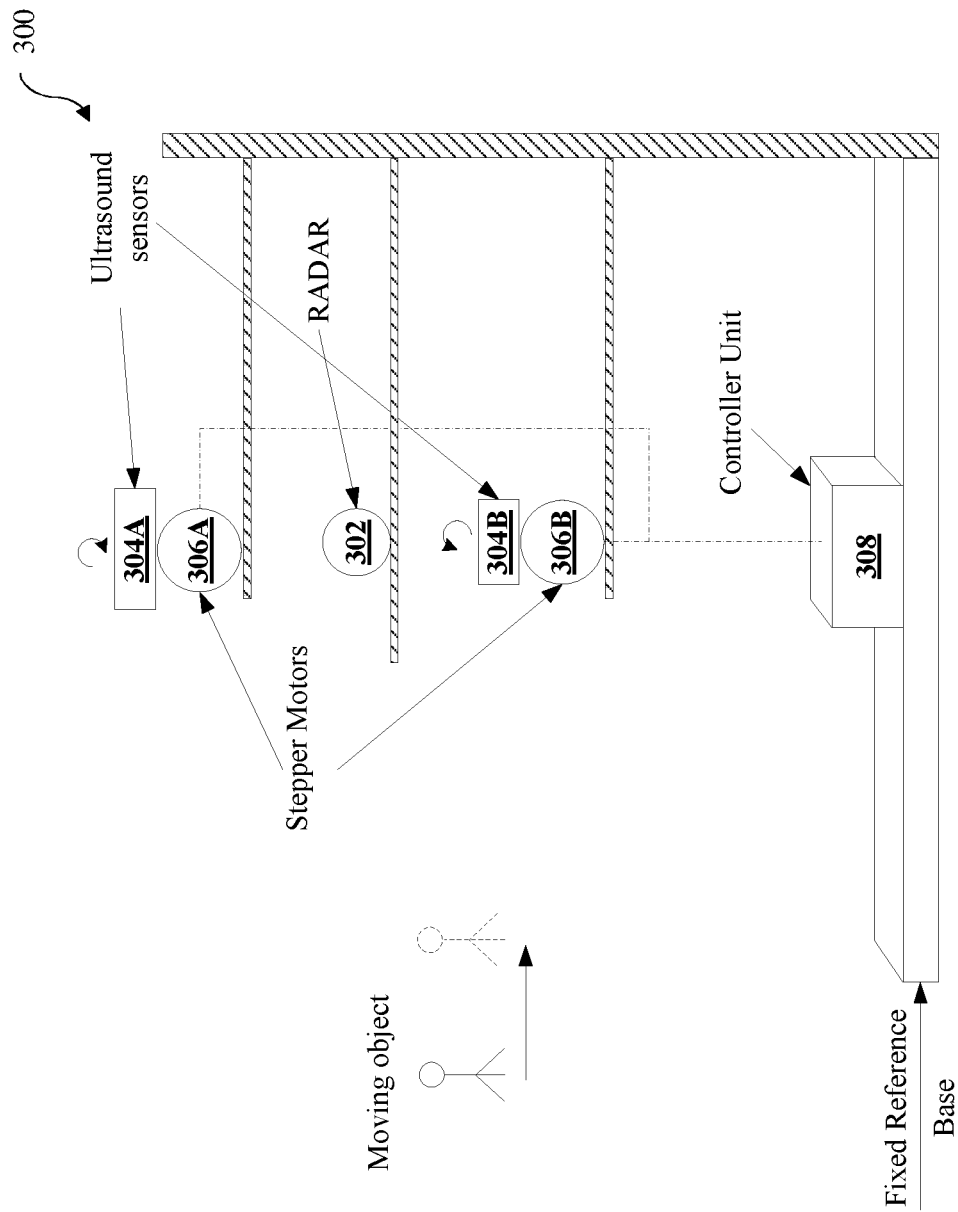
FIG. 3 illustrates a schematic representation of a tracking apparatus in accordance with an embodiment of the present disclosure.

Referring now to the drawings, and more particularly to FIGS. 1 through 3, where similar reference characters denote corresponding features consistently throughout the figures, there are shown preferred embodiments and these embodiments are described in the context of the following exemplary system and method.

FIG. 1 illustrates an exemplary block diagram of a system 100 for RADAR and ultrasound sensor based real time tracking of a moving object. In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 102.

In an embodiment, the system 100 includes one or more data storage devices or memory 102 operatively coupled to the one or more processors 104 and is configured to store instructions configured for execution of steps of the method 200 by the one or more processors 104.

FIG. 2A through FIG. 2B is an exemplary flow diagram 200 illustrating a computer implemented method for RADAR and ultrasound sensor based real time tracking of a moving object, in accordance with an embodiment of the present disclosure and FIG. 3 illustrates a schematic representation of a tracking apparatus in accordance with an embodiment of the present disclosure. The steps of the method 200 will now be explained in detail with reference to the components of the tracking apparatus of FIG. 3 and the system 100 of FIG. 1. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

In accordance with an embodiment of the present disclosure, the one or more processors 104 are configured to receive a first echo response, at step 202, from a moving object detector (302 of FIG. 3) indicative of the moving object under observation being detected in a field of view (FOV) of the moving object detector. In an embodiment, the moving object detector may be one of a RADAR, SOund Navigation And Ranging (SONAR) and Light Detection And Ranging (LIDAR). The one or more processors 104 are further configured to log speed of the moving object, at step 204, based on the first echo response and initiate tracking of the moving object continuously in real time, at step 206, by a moving object tracker upon detecting the moving object by the moving object detector. In an embodiment of the present disclosure, the moving object tracker comprises two ultrasound sensors (304A and 304B of FIG. 3) having a common axis of rotation, each ultrasound sensor being mechanically coupled to a corresponding stepper motor (306A and 306B of FIG. 3) configured to incrementally change the orientation of the moving object tracker as represented generally in FIG. 3. The entire assembly is arranged such that a base provides a fixed reference for further computation by a controller unit (308 of FIG. 3). The RADAR and the two ultrasound sensors are arranged in close proximity to each other such that the object under observation lies in the FOV of the RADAR and can be captured in the Field of Regard (FOR) of the two ultrasound sensors. Also, for all practical purposes, the distance of the moving object to the RADAR may be considered equal to the distances to the two ultrasound sensors. In an embodiment of the present disclosure, the controller unit comprises one or more data storage devices (not shown) configured to store instructions and one or more data hardware processors (not shown) operatively coupled to the one or more data storage devices, wherein the one or more hardware processors are configured by the instructions to perform the steps 204 through 206 described herein above with sub-steps of step 206 (206A through 206F) described hereinafter.

For ease of explanation, the description hereinafter particularly addresses a preferred simple and low cost embodiment wherein a Continuous Wave (CW) Doppler RADAR is used as a moving object detector along with two ultrasound sensors serving as a moving object tracker. However, other types of moving object detectors and moving object trackers may be employed within the scope of the present disclosure. In accordance with the present disclosure, the tracking operates in two phases—a search phase and a locked-in phase. On movement of any object in the vicinity, the stationary RADAR detects the object and logs its speed, while the two ultrasonic sensors are triggered to get into the search phase and detect the object. The ultrasonic sensors rotate in opposite directions—one sensor rotates clockwise and the other rotates anti-clockwise to enable 360 degree coverage for detection.

In accordance with an embodiment of the present disclosure, the one or more processors 104 may be configured to position the moving object detector such that the moving object under observation lies in the FOV thereof and further configured to position the moving object tracker such that the moving object under observation lies in the FOR thereof.

In accordance with an embodiment of the present disclosure, the one or more processors 104 are configured to incrementally change orientation of the moving object tracker, at step 206A, as part of the search phase. When the system 100 is turned on, the two ultrasound sensors are in alignment and focused in the same direction which is 0° in its own coordinate system. The change in orientation starts from the 0° position or from a last locked-in position of the locked-in phase, by a pre-configured value, until the moving object is detected in a field of regard (FOR) of the moving object tracker. If the moving object is detected right after the search phase begins, then there is no change in orientation of the moving object tracker.

In an embodiment, once the moving object is detected in the FOR of the moving object tracker, the one or more processors 104 are configured to receive a second echo response at step 206B. In an embodiment, at step 206C, distance of the moving object from the moving object tracker is continuously logged along with an associated time stamp and a current orientation of the moving object tracker based on the second echo response. The one or more processors are further configured to compute speed of the moving object, at step 206D, based on the logged distance and the associated time stamp.

It is imperative to confirm whether the moving object being tracked by the moving object tracker is same as the moving object detected by the moving object detector. This is achieved by the one or more processors, at step 206E by comparing the speed of the moving object computed at step 206D with the speed logged by the moving object detector at step 204 to confirm the moving object tracked by the moving object tracker is the same as the moving object detected by the moving object detector. Based on the confirmation as a result of the comparison at step 206E, the orientation of the moving object tracker is locked at the current orientation at step 206F. In an embodiment, the current orientation is the last locked-in position before the moving object moves out of the FOR. In another embodiment, it may have been the 0° position if the moving object was initiated right at the start thereby leading to locking the orientation of the moving object tracker at that instance without a need for changing the orientation. Thus for a locked-in position, uncertainty of locating the moving object may be represented as d*θ, wherein d is the distance of the moving object from the moving object tracker and θ is the current orientation of the moving object tracker. Thus further the moving object is from the moving object tracker (i.e. greater the value of d), the uncertainty increases (considering e is constant at that instance).

In an embodiment, the speed v of the moving objected is computed based on the distance and the associated time stamp logged by the moving object tracker as represented herein below:

$$v = \text{median}(v_1, v_2, \ldots, v_{n-1})$$

wherein $$v_i = \frac{(d_i - d_{(i-1)})}{\delta t},$$

average distance $d = \text{average}(d_1, d_2, \ldots, d_n)$, $\delta t$ is the time difference between consecutive measurements that were logged for n measurements.

If the computed speed (at step 206D) v==the speed logged by the moving object detector at step 204 (within ±0.1 m/s), then the moving object tracker switches to the locked-in phase and continues tracking the detected moving object, else the detected moving object is abandoned and the moving object tracker moves back to the search phase to continue detection of the moving object.

In accordance with an embodiment of the present disclosure, the step of incrementally changing orientation of the moving object tracker comprises rotating the two ultrasound sensors having a common axis of rotation in opposite directions by the pre-configured value until a maximum permissible rotation angle ($\gamma\theta_{max}$) for either of the two ultrasound sensors is attained with $\theta_1$ and $\theta_2$ being the orientations of the two ultrasound sensors and d being the distance of the moving object from the two ultrasound sensors. Accordingly, both the ultrasound sensors rotate in parallel planes with the same angular speed but in opposite directions such that a vector sum of their angular velocities is zero.

Since the object under observation is in motion, the FOV of the ultrasound sensors need to be changed accordingly to ensure efficient tracking. In accordance with an embodiment of the present disclosure, the step of incrementally changing orientation of the moving object tracker is associated with an angular speed of rotation thereof, the angular speed of rotation being a function of a last logged distance of the moving object from the moving object detector and an angle of rotation associated with the last locked-in position. This may be represented as given below.

```
Function angular_speed (d, count):
    If (count >50) {
        Return 4 // that is rotate a 4 rad/s
    } else if (Count >25) {
        Return π
    }
    else {
        ω = max (4 / d, 8π) // for distant object are rotation is done
    slowly
        return ω
}
```

The angular speed is adequately set to match rotation of θ and a stop and compute time of 0.4 seconds together. So at an average a rotation takes (θ/ω+0.05) seconds, wherein θ/ω represents the time taken for the rotation and 0.05 represents the time allotted for measurement. For instance, an angular speed of 4 rad/s gives total scanning time for 180 degree as 0.6+0.785=1.385 s.

In accordance with an embodiment of the present disclosure, the step of logging distance of the moving object from the moving object tracker along with an associated time stamp and a current orientation of the moving object tracker comprises aligning the current orientation of a first ultrasound sensor of the two ultrasound sensors with the current orientation of a second ultrasound sensor of the two ultrasound sensors that has detected the moving object and locking the current orientation thereof. Accordingly, if the ultrasound sensor 304B in FIG. 3 locates the moving object, the ultrasound sensor 304A aligns itself with the ultrasound sensor 304B and both the ultrasound sensors start logging the distance of the moving object from itself.

The search phase in accordance with an embodiment of the present disclosure may be represented as below.

```
Search phase:
For count (no. of rotations/angle of rotation) = 0,
While (RADAR detects a moving object AND the moving object is not detected by the ultrasound sensors) {
count = count + 1
Rotate ultrasound sensor 304B by +θ and rotate ultrasound sensor 304A
by - θ with an angular speed ω = angular speed (d, count), where d is the
last logged distance of the moving object from the RADAR and the angle
of rotation associated with the last locked-in position using the below
logic.
    If (θ₁ + θ > θₘₐₓ) {
        θ₁ = 0
    } else {
        Increment θ₁ by + θ
    }
    If (θ₂ - θ < -θₘₐₓ) {
        θ₂ =θ
    } else {
        θ₂ by - θ
    } // θ is fixed for a particular ultrasound sensor, for instance, 1°.
If (moving object is found by ultrasound sensor i): // i = ultrasound sensor
304A or 304B
    {
    Rotate the other ultrasound sensor to the same orientation
    Log the current distance of the moving object
    Update θ₁ and θ₂
    Count = 0
    Switch to locked-in phase
    }
}
```

The locked-in phase in accordance with an embodiment of the present disclosure may be represented as below. When a moving object is detected by the moving object detector and both the ultrasound sensors constituting the moving object tracker are locked-in a similar orientation, the distance d of the moving object from the ultrasound sensors is continuously logged. If the moving object moves out of the FOV of either of the ultrasound sensors, the search phase is initiated.

In accordance with an embodiment of the present disclosure, the step of logging the distance of the moving object from the moving object tracker along with an associated time stamp and a current orientation of the moving object tracker is performed at an adaptively changing sampling frequency that is pre-configured based on empirical knowledge of the object being observed and is inversely proportional to the last logged distance (d) of the moving object from the moving object tracker. An exemplary pre-configured table (independent of the sensors used) may be as given below.

| Current measured speed (moving average for past 0.5 seconds) per unit distance (Hz) | Sampling frequency Fs Hz | Tracking frequency (i.e. moving average down sample) |
| --- | --- | --- |
| <0.4/d | 100 Hz (default) | 5 Hz |
| >=0.4/d & 1/d | 200 Hz | 10 Hz |
| >1/d | 250 Hz | 15 Hz |

It may be noted that as the speed of the moving object increases, the sampling frequency also increases. The tracking frequency is a down sampled frequency based on the empirical knowledge of the object being observed.

Systems and methods of the present disclosure provide a simple and cost effecting solution for real time tracking of a moving object in a controlled environment. Although various means as suggested may be used for the moving object detector and the moving object tracker, a preferred combination includes a Doppler RADAR and two ultrasound sensors.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method for real time tracking of a moving object under observation (200) comprising:
   receiving a first echo response from a moving object detector indicative of the moving object under observation being detected in a field of view (FOV) of the moving object detector (202);
   logging speed of the moving object based on the first echo response (204); and
   tracking the moving object continuously in real time, by a moving object tracker, upon detecting the moving object by the moving object detector (206), wherein the tracking comprises:
      incrementally changing orientation of the moving object tracker from either a last locked-in position or a 0° angle of rotation, by a pre-configured value, until the moving object is detected in a field of regard (FOR) of the moving object tracker (206A);
      receiving a second echo response from the moving object tracker when the moving object is detected in the FOR of the moving object tracker (206B);
      logging distance of the moving object from the moving object tracker along with an associated time stamp and a current orientation of the moving object tracker, based on the second echo response (206C);
      computing speed of the moving object based on the logged distance and the associated time stamp (206D);
      comparing the computed speed of the moving object with the logged speed by the moving object detector to confirm the moving object tracked by the moving object tracker is the same as the moving object detected by the moving object detector (206E); and
      locking the orientation of the moving object tracker at the current orientation based on the comparison, wherein the current orientation is the last locked-in position before the moving object moves out of the FOR (206F).

2. The processor implemented method of claim 1, wherein the step of incrementally changing orientation of the moving object tracker is associated with an angular speed of rotation thereof, the angular speed of rotation being a function of a last logged distance of the moving object from the moving object detector and an angle of rotation associated with the last locked-in position.

3. The processor implemented method of claim 2, wherein the step of logging the distance of the moving object from the moving object tracker along with an associated time stamp and a current orientation of the moving object tracker is performed at an adaptively changing sampling frequency that is pre-configured based on empirical knowledge of the object being observed and is inversely proportional to the last logged distance of the moving object from the moving object tracker.

4. The processor implemented method of claim 1, wherein the step of receiving a first echo response is preceded by positioning the moving object detector such that the moving object under observation lies in the FOV thereof.

5. The processor implemented method of claim 4, wherein the moving object detector is one of a RAdio Detection And Ranging (RADAR), SOund Navigation And Ranging (SONAR) and Light Detection And Ranging (LIDAR).

6. The processor implemented method of claim 1, wherein the step of tracking the moving object continuously in real time, by a moving object tracker is preceded by positioning the moving object tracker such that the moving object under observation lies in the FOR thereof.

7. The processor implemented method of claim 6, wherein the moving object tracker comprises two ultrasound sensors, each ultrasound sensor being mechanically coupled to a corresponding stepper motor configured to incrementally change the orientation of the moving object tracker.

8. The processor implemented method of claim 7, wherein the step of incrementally changing orientation of the moving object tracker comprises rotating the two ultrasound sensors having a common axis of rotation in opposite directions by the pre-configured value until a maximum permissible rotation angle for either of the two ultrasound sensors is attained.

9. The processor implemented method of claim 8, wherein the step of logging distance of the moving object from the moving object tracker along with an associated time stamp and a current orientation of the moving object tracker comprises aligning the current orientation of one of a first ultrasound sensor of the two ultrasound sensors with the current orientation of a second ultrasound sensor of the two ultrasound sensors that has detected the moving object and locking the current orientation thereof.

10. A tracking apparatus (300) comprising:
a moving object detector (302) being one of a RAdio Detection And Ranging (RADAR), SOund Navigation And Ranging (SONAR) and Light Detection And Ranging (LIDAR) positioned such that a moving object under observation lies in a field of view (FOV) thereof;
a moving object tracker (304A, 304B) located proximate the moving object detector, the moving object tracker comprising two ultrasound sensors having a common axis of rotation, each ultrasound sensor being mechanically coupled to a corresponding stepper motor (306A, 306B) configured to incrementally rotate the two ultrasound sensors by a pre-configured angle of rotation in opposite directions, until a maximum permissible rotation angle for either of the two ultrasound sensors is attained;
a controller unit (308) comprising:
one or more data storage devices configured to store instructions; and
one or more hardware processors operatively coupled to the one or more data storage devices, wherein the one or more hardware processors are configured by the instructions to:
receive a first echo response from the moving object detector indicative of the moving object being detected in the field of view (FOV) of the moving object detector;
log speed of the moving object based on the first echo response; and
track the moving object continuously in real time, by a moving object tracker, upon detecting the moving object by the moving object detector, wherein the moving object is tracked continuously in real time by:
incrementally changing orientation of the moving object tracker from either a last locked-in position or a 0° angle of rotation, by a pre-configured value, until the moving object is detected in a field of regard (FOR) of the moving object tracker;
receiving a second echo response from the moving object tracker when the moving object is detected in the FOR of the moving object tracker;
logging distance of the moving object from the moving object tracker along with an associated time stamp and a current orientation of the moving object tracker, based on the second echo response;
computing speed of the moving object based on the logged distance and the associated time stamp;
comparing the computed speed of the moving object with the logged speed by the moving object detector to confirm the moving object tracked by the moving object tracker is the same as the moving object detected by the moving object detector; and
locking the orientation of the moving object tracker at the current orientation based on the comparison, wherein the current orientation is the last locked-in position before the moving object moves out of the FOR.

11. A system (100) comprising:
one or more data storage devices (102) operatively coupled to one or more hardware processors (104) and configured to store instructions configured for execution by the one or more hardware processors to:
receive a first echo response from a moving object detector indicative of the moving object under observation being detected in a field of view (FOV) of the moving object detector;
log speed of the moving object based on the first echo response; and
track the moving object continuously in real time, by a moving object tracker, upon detecting the moving object by the moving object detector, wherein the moving object is tracked continuously in real time by:
incrementally changing orientation of the moving object tracker from either a last locked-in position or a 0° angle of rotation, by a pre-configured value, until the moving object is detected in a field of regard (FOR) of the moving object tracker;
receiving a second echo response from the moving object tracker when the moving object is detected in the FOR of the moving object tracker;
logging distance of the moving object from the moving object tracker along with an associated time stamp and a current orientation of the moving object tracker, based on the second echo response;
computing speed of the moving object based on the logged distance and the associated time stamp;
comparing the computed speed of the moving object with the logged speed by the moving object detector to confirm the moving object tracked by the moving object tracker is the same as the moving object detected by the moving object detector; and
locking the orientation of the moving object tracker at the current orientation based on the comparison, wherein the current orientation is the last locked-in position before the moving object moves out of the FOR.

12. The system of claim 11, wherein incrementally changing orientation of the moving object tracker is associated with an angular speed of rotation thereof, the angular speed of rotation being a function of a last logged distance of the moving object from the moving object detector and an angle of rotation associated with the last locked-in position.

13. The system of claim 12, wherein logging the distance of the moving object from the moving object tracker along with an associated time stamp and a current orientation of the moving object tracker at an adaptively changing sampling frequency that is pre-configured is based on empirical knowledge of the object being observed and is inversely proportional to the last logged distance of the moving object from the moving object tracker.

14. The system of claim 11, wherein the one or more hardware processors are further configured to position the moving object detector such that the moving object under observation lies in the FOV thereof.

15. The system of claim 14, wherein the moving object detector is one of a RAdio Detection And Ranging (RADAR), SOund Navigation And Ranging (SONAR) and Light Detection And Ranging (LIDAR).

16. The system of claim 11, wherein the one or more hardware processors are further configured to position the moving object tracker such that the moving object under observation lies in the FOR thereof.

17. The system of claim 16, wherein the moving object tracker comprises two ultrasound sensors, each ultrasound sensor being mechanically coupled to a corresponding stepper motor configured to incrementally change the orientation of the moving object tracker.

18. The system of claim 17, wherein the one or more hardware processors are further configured to incrementally change the orientation of the moving object tracker by rotating the two ultrasound sensors having a common axis of rotation in opposite directions by the pre-configured value until a maximum permissible rotation angle for either of the two ultrasound sensors is attained.

19. The system of claim 18, wherein the one or more hardware processors are further configured to log the distance of the moving object from the moving object tracker along with an associated time stamp and a current orientation of the moving object tracker by aligning the current orientation of a first ultrasound sensor of the two ultrasound sensors with the current orientation of a second ultrasound sensor of the two ultrasound sensors that has detected the moving object and locking the current orientation thereof.

* * * * *